Figure 1:
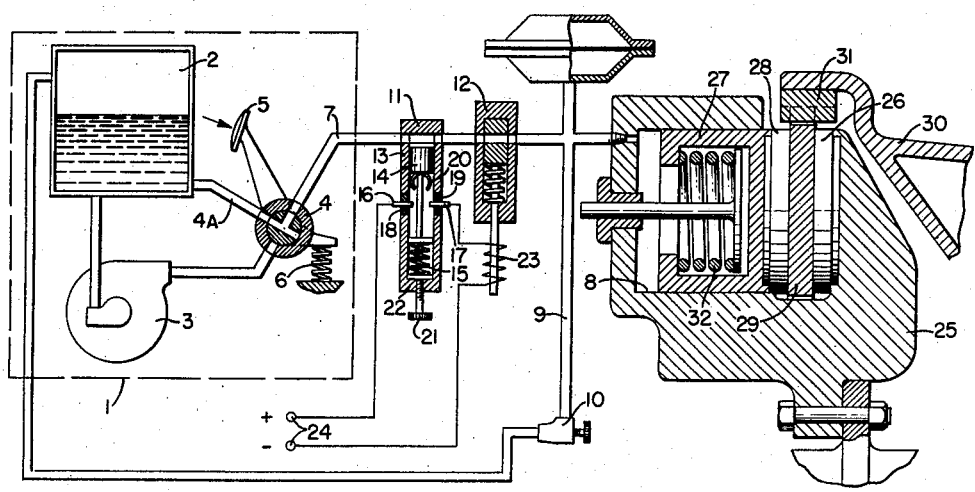

July 22, 1958  E. T. ARMSTRONG  2,844,227
APPARATUS FOR ACTUATING FRICTION BRAKES
Filed Jan. 9, 1956

INVENTOR.
EDWARD T. ARMSTRONG
BY
*R. L. Miller*
ATTORNEY

United States Patent Office 2,844,227
Patented July 22, 1958

2,844,227

APPARATUS FOR ACTUATING FRICTION BRAKES

Edward T. Armstrong, Butler, N. J., assignor to The Goodyear Tire & Rubber Company, Akron, Ohio, a corporation of Ohio Application January 9, 1956, Serial No. 557,960

5 Claims. (Cl. 188—151)

This invention relates to apparatus and methods for actuating friction elements, more especially to apparatus and methods for control of brake action and to the controlled release of brake pressures.

Heretofore, there have been provided many different types of brakes or other means for actuating friction elements. While all of such constructions seek to provide maximum efficiency in the braking and/or stopping means used, and to provide a practical construction with effective stopping action, still such brake construction or other apparatus have not satisfactorily achieved the desired results.

In brake operating systems heretofore constructed, there has been no limit, within the available braking force set by the geometry of the system, to the maximum brake pressure and there has been no provision for programming the application of brake pressure throughout the period of brake application. As a result, the efficiency of braking has not been as high as would be possible.

It is an object of the present invention to provide an adjustable top limit on brake pressure and to provide for determinate programming of brake pressure.

It is a further object of the invention to regulate applied brake pressure and provide the highest efficiency of brake application relative to brake temperature throughout the period of brake application.

Further objects are to permit a further application of brake pressure during decay of pressure of initial brake application, to provide adjustability of rate of brake pressure decay and to permit quick release of the brake.

Another object of the invention is to use the temperature of the braked means and/or braking elements for controlling the rate of deterioration of a braking force.

Another object of the invention is to provide a braking method characterized by controlled deterioration of the braking forces.

Another object of the invention is to use a compressible gas in a spur conduit of a hydraulic pressure system to permit large volumes of fluid to be used for controlling braking pressures.

A further object of the invention is to provide braking apparatus for hydraulic brake systems wherein a compressible fluid is provided in a special chamber in operative association with the system so that relatively large volumes of fluid can be released with relatively small changes in brake pressure.

A further object of the invention is to use a surge tank means in a braking system to facilitate control of braking pressures.

The foregoing and other objects and advantages of the invention will be made more apparent as the specification proceeds.

Figure 2:
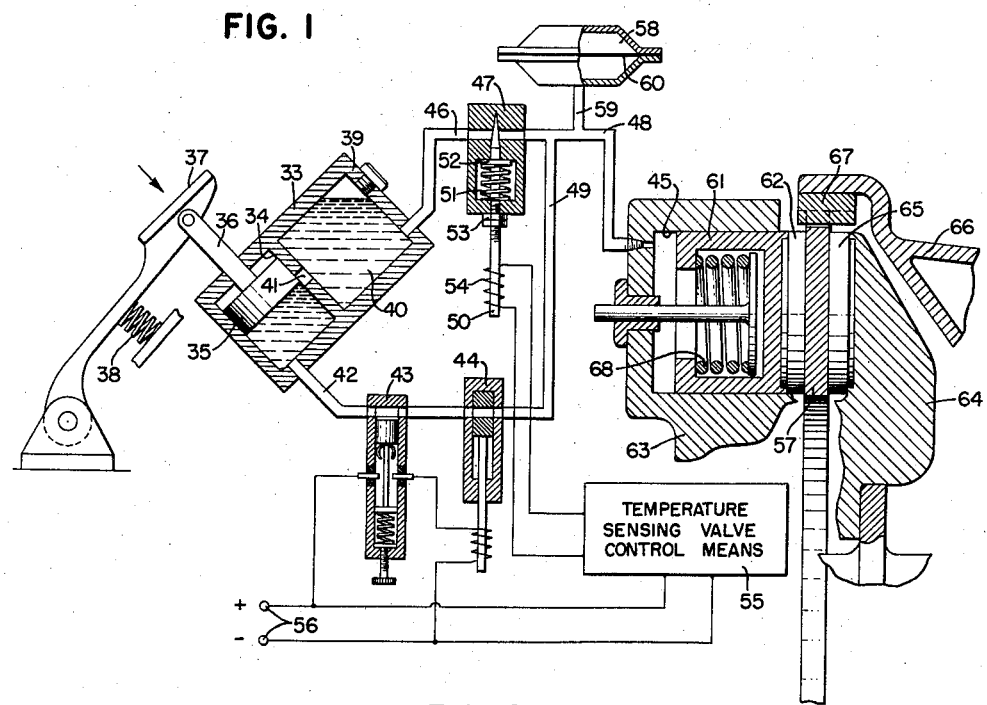

For a better understanding of the principles of the invention, reference now should be had to the accompanying drawings that illustrate apparatus for actuating friction elements, which apparatus embodies the principles of the invention, and wherein:

Fig. 1 is a partly diagrammatic, sectional view of apparatus for actuating friction elements; and Fig. 2 is a diagrammatic, partly sectioned view of a modified type of apparatus of the invention.

The present invention in general relates to a brake having pressure supply, an operating or actuating cylinder, braking means and fluid pressure operated control means for connecting the operating cylinder and the pressure supply, and a control valve for permitting slow flow of pressure fluid to the pressure supply reservoir from the operating cylinder for controlling a slow programmed release of brake pressure.

In one form of the invention, temperature sensitive means are used to regulate the control valve dependent upon the temperature of the braking means so that the braking pressures can be maintained at a desirable operating condition for maximum braking effectiveness and efficiency throughout brake application.

When referring to corresponding parts shown in the accompanying drawings and referred to in the specification, corresponding numerals are used to facilitate comparison between such equivalent parts referred to in the specification and shown in the drawings.

Attention now is directed to the details of the construction shown in the drawings, and first to Fig. 1 thereof wherein a conventional power operated pressure system is indicated as a part of the brake apparatus of the invention which is indicated as a whole by the numeral 1. This system includes a reservoir 2 and a pump 3 for receiving fluid therefrom and delivering it to a control valve 4 to which the pilot may apply pressure either manually or otherwise, as by a pedal 5, when brake action is desired. The pedal is adapted to be returned by a spring 6. Fluid under pressure is delivered through a conduit 7 that connects the valve 4 to a brake operating or actuating cylinder 8. It should be understood that the brake cylinder 8 may be of any desired construction and that any known or conventional type of a hydraulic brake actuating means may be used in practice of the invention. The apparatus illustrated comprises one embodiment of the principles of the invention.

A by-pass line 9 connects the operating cylinder 8 with the reservoir 2 through an adjustable bleeder valve 10. Located in the line 7 between the valve 4 and the operating cylinder 8 are in succession a pressure operated switch 11 adjacent valve 4 and a solenoid operated normally open slide valve 12 nearer the operating cylinder. The switch comprises a cylinder 13, a piston 14, slidably mounted therein and a coil spring 15 urging the piston against fluid pressure provided by the line 7 connecting with one end of the cylinder. A pair of electrical contacts 16, 17 are inserted through insulated bushings 18, 19 in the cylinder walls and are adapted to be closed by a shorting contact 20 carried by the piston 14. A spring pressure adjusting screw 21 is threaded through an end cylinder wall 22 and engages an end of the spring 15. This arrangement is such that pressure in line 7 is applied to piston 14 urging it along the cylinder 13 and compressing the spring 15. When pressure in line 7 equals a desired high limit, piston 14 closes contacts 16, 17.

Solenoid valve 12, normally open has a closing solenoid 23 adapted to be energized from a supply at terminals 24 when switch 11 is closed, the switch and the solenoid being connected in series.

Cylinder 8 is formed in a nonrotatable support 25 which carries a stationary brake shoe 26 opposite the cylinder 8, the piston 27 fitted in cylinder 8 having an opposed brake shoe 28 mounted thereon. A rotatable brake disc 29 is carried by a rotating wheel 30 on which it is suspended between the brake shoes 26, 28 for axial floating movement by keys 31 secured to the wheel, A coil return spring 32 normally holds the piston 27 in retracted position so that brake shoe 28 clears the disc 29.

The control valve 4 is a three way valve and when the pedal 5 is released, the conduit 7 is shut off from the pump 3 and is connected through a by-pass 4a with reservoir 2.

The operation of the apparatus of Fig. 1 is as follows:

With pedal 5 released as shown, liquid under pressure is shut off from conduit 7. When valve 4 is operated to shut off return line 4a from conduit 7 and to connect pump 3 to cylinder 8 applying the brake. As pressure builds up in line 7, piston 14 of switch 11 is moved along its cylinder against pressure of spring 15. When the fluid pressure reaches a determined limit, piston 14 closes the circuit of solenoid 23. This closes valve 12 thereby sealing off cylinder 8 except for leakage through bypass line 9 permitted by bleeder valve 10. Valve 10 can be adjusted so that there is a decay of pressure in brake cylinder 8 adapted to provide the greatest amount of brake pressure at any instant consistent with temperature of the brake at that instant due to absorbed energy. The rate of pressure decay may be set by adjustment of bleeder valve 10. Should it be desired by the operator to release brake pressure, the pedal 5 may be released whereupon dropping of pressure at switch 11 causes its contacts to open, de-energizing solenoid 23 and valve 12 opens under pressure of its return spring. The cylinder 8 may then unload quickly through line 4a. Should it be desired to reapply brake pressure, this is accomplished by depressing pedal 5 as before.

Now referring to the embodiment of the invention illustrated in Fig. 2 an accumulator 33 has a master cylinder 34 having a piston 35 and piston rod 36 adapted to be operated by pedal 37, biased by a spring 38. A reservoir 39 is filled with fluid 40 which supplies cylinder 34 through an opening 41. This accumulator takes the place of the pressure supply system of Fig. 1.

A pressure line 42 connects the cylinder 34 through a pressure operated switch 43 and a normally open solenoid valve 44 in succession with a brake operating cylinder 45. The switch 43, valve 44 and cylinder 45 may be identical to the switch 11, valve 12 and actuating cylinder 8 of Fig. 1.

To provide for controlled decay of brake pressure, a bypass line 46 connects actuating cylinder 45 with reservoir 39 through a needle bleeder valve 47 and line 48 which connects cylinder 45 to valve 47 and also by way of line 49 to cylinder 34 through valve 44 and line 42. Needle bleeder valve 47 has a spindle 50 slidable in the valve to cut off or open the cross passage between lines 46 and 48. A compression coiled spring 51 engages a shoulder 52 of the spindle at one end and the valve body at the other end to hold the spindle in closed position. Stop nuts 53 threaded on the spindle may be adjusted to hold the valve in slightly open positions. A solenoid 54 is provided about the spindle. Energizing of the solenoid will open the valve wider. An electrical temperature sensitive valve control means 55 is located near the brake and is supplied by electric current through terminals 56. The control means is sensitive to temperature and heating of the brake disc 57 causes the control means to energize the solenoid. A bolometer or a thermostat controlling an amplifier operating a relay may be used as the heat sensitive control means.

To provide greater flexibility and smoothness of operation, a surge tank 58 is connected to line 48 by a branch or spur line 59. The surge tank is constructed of two flanged hollow members secured together at their flanges with a flexible elastic diaphragm 60 therebetween and separating the surge tank into two chambers, one of which connects through lines 59 and 48 with the brake operating cylinder 45 and the other of which contains air or other compressible gas and is closed. The surge tank provides for storage of hydraulic fluid and not only provides smoothness of operation but maintains a continuity of pressure in the brake operating cylinder at all times during brake application periods.

In this embodiment of the invention, as in the embodiment of Fig. 1, the cylinder 45 has slidably fitted therein, a piston 61 which carries a brake shoe 62. The cylinder 45 is formed in a non-rotating bracket 63 which has an arm 64 opposed to the cylinder and carrying a brake shoe 65. A rotatable wheel 66 carries the annular brake disc 57 suspended therefrom for axial floating upon keys 67 so that the disc will clear the shoes when brake pressure is released. A return spring 68 serves to return the piston 61.

The operation of the apparatus of Fig. 2 is as follows:

The needle valve 47 may be adjusted by moving the nuts 53 along the spindle 50 to provide the desired leakage. The valve 44 is normally open. When the pedal is depressed, piston 35 first closes off passage 41 and then forces hydraulic fluid through line 42, valve 44 and lines 49 and 48 to cylinder 45 where it advances piston 61 to apply the brake. As pressure in the system builds up, pressure responsive switch 43 closes energizing solenoid valve 44, closing that valve. Now until foot pressure on the pedal is released, fluid from cylinder 45 may escape slowly through needle valve 47 or be stored in surge chamber 58 against pressure of the gas therein. Should the brake disc 57 heat up excessively, this will be sensed by the heat sensing valve control means which will then energize solenoid 54 to open needle valve 47 further and increase leakage through the bypass 46. Should the brake disc cool, the solenoid will be de-energized and needle valve 47 will return to its initial setting.

Should the pilot desire to release the brake at any time, he merely releases the pedal and the resulting release of pressure in line 42 causes switch 43 to open and thereby open valve 44 so that pressure on cylinder 45 is quickly released. The brake may be reapplied by simply depressing the brake pedal.

It may be shown mathematically that for a certain brake, a desirable rate of decay of brake pressure is desirable during brake application to accomplish the greatest brake efficiency without destructive damage to the brake. With the embodiment of Fig. 1, the bleeder valve 10 may be adjusted to approximate this ideal decay. In the embodiment of Fig. 2, the bleeder valve 47 is controlled by the temperature of the brake itself and is even more efficient.

While for illustrative purposes, the manually controlled bleeder valve of Fig. 1 has been shown with a power operated pressure supply system and the temperature controlled bleeder valve of Fig. 2 has been shown with a master cylinder pressure supply system, the invention contemplates employing the temperature controlled bleeder valve 47 in place of the valve 10 of Fig. 1 or the valve 10 of Fig. 1 in place of the valve 49 of Fig. 2 without departing from the invention.

While a certain representative embodiment and details have been shown for the purpose of illustrating the invention, it will be apparent to those skilled in this art that various changes and modifications may be made therein without departing from the spirit or scope of the invention.

What is claimed is:

1. Brake operating apparatus comprising a hydraulic pressure supply system including a positive shut off pressure supply valve, a brake actuating cylinder, a fluid pressure delivery line connecting said pressure supply system to said actuating cylinder, a cut off valve in said delivery line between said supply valve and said actuating cylinder to entrap operating fluid under pressure in said actuating cylinder, means controlled by pressure in said line for closing said cut-off valve at a desired brake actuating pressure, an adjustable bleeder connected to said actuating cylinder and providing a planned decay of brake pressure throughout a brake application period, and a surge tank also connected to said actuating cylinder to provide for storage of liquid under pressure when said cut-off valve is closed.

2. Brake operating apparatus comprising a hydraulic pressure supply system including a positive shut off pressure supply valve, a brake actuating cylinder, a fluid pressure delivery line connecting said pressure supply system to sad actuating cylinder, a cut off valve in said delivery line between said supply valve and said actuating cylinder to entrap operating fluid under pressure in said actuating cylinder, means controlled by pressure in said line for closing said cut-off valve at a desired brake actuating pressure, an adjustable bleeder connected to said actuating cylinder and providing a planned decay of brake pressure throughout a brake application period, said adjustable bleeder comprising a normally closed solenoid operated valve, means for adjusting said valve for a minimum leakage, and temperature sensing means closely adjacent said brake and controlled by heating of said brake to energize said solenoid operated valve to increase its opening.

3. Brake operating apparatus comprising a hydraulic pressure supply system, a brake actuating cylinder, a fluid pressure delivery line connecting said pressure supply system to said actuating cylinder, a normally open solenoid operated cut-off valve in said line, a pressure controlled switch connected to said line between the pressure supply system and said cut-off valve, said switch being adapted to close said cut-off valve when the hydraulic pressure in said line reaches a desired maximum pressure, and an adjustable passage connected to said actuating cylinder to provide brake pressure decay by controlled leakage of pressure fluid from said actuating cylinder.

4. Brake operating apparatus comprising hydraulic pressure supply system, a brake actuating cylinder, a fluid pressure delivery line connecting said pressure supply system to said actuating cylinder, a normally open solenoid operated cut-off valve in said line, a pressure controlled switch connected to said line between the pressure supply system and said cut-off valve, said switch being adapted to close said cut-off valve when the hydraulic pressure in said line reaches a desired maximum pressure, and an adjustable passage connected to said actuating cylinder to provide brake pressure decay by controlled leakage of pressure fluid from said actuating cylinder, said adjustable passage comprising a needle valve manually adjustable to provide the desired rate of leakage.

5. Brake operating apparatus comprising a hydraulic pressure supply system, a brake actuating cylinder, a fluid pressure delivery line connecting said pressure supply system to said actuating cylinder, a normally open solenoid operated cut-off valve in said line, a pressure controlled switch connected to said line between pressure supply system and said cut-off valve, said switch being adapted to close said cut-off valve when the hydraulic pressure in said line reaches a desired maximum pressure, and an adjustable passage connected to said actuating cylinder to provide brake pressure decay by said adjustable passage comprising an adjustable needle valve, a solenoid for opening said valve beyond its adjusted position, and a temperature sensing valve control means at the brake and adapted to energize said solenoid to open said needle valve when heating of the brake is excessive.

References Cited in the file of this patent
UNITED STATES PATENTS

| | | |
|---|---|---|
| 1,460,164 | Loughead | June 26, 1923 |
| 1,577,105 | Cattaneo | Mar. 16, 1926 |
| 1,838,668 | Frock | Dec. 29, 1931 |
| 2,117,078 | Brauer | May 10, 1938 |
| 2,152,489 | Lamb | Mar. 28, 1939 |
| 2,289,273 | Klaburner | July 7, 1942 |